United States Patent [19]

Junker et al.

[11] 3,964,753

[45] June 22, 1976

[54] CONTROLLED APERTURE SEAL

[75] Inventors: Arnold E. Junker, Bridgeport, Conn.; Anthony J. Massaro, St. Marys, Pa.

[73] Assignee: Avco Corporation, Stratford, Conn.

[22] Filed: Jan. 9, 1975

[21] Appl. No.: 539,621

[52] U.S. Cl. ................................ 277/26; 277/216
[51] Int. Cl.² ........................................... F16J 15/30
[58] Field of Search ................ 277/22, 53, 54, 216, 277/217, DIG. 6, 26, 136, 137, 27, 154, 156, 29

[56] References Cited
UNITED STATES PATENTS

| | | | |
|---|---|---|---|
| 2,971,783 | 2/1961 | Laser | 277/26 |
| 3,306,620 | 2/1967 | Taschenberg | 277/26 |
| 3,460,843 | 8/1969 | Jaeger | 277/26 |

*Primary Examiner*—Robert J. Smith
*Attorney, Agent, or Firm*—Charles M. Hogan; Irwin P. Garfinkle

[57] ABSTRACT

A carbon ring seal for a shaft rotating at high speed is capable of preventing high temperature, high pressure gas from entering the oil system. The carbon seal is constructed so that at ambient temperature it works as a controlled gap seal, but when the seal runner reaches its full thermal growth the seal then functions as a positive contact seal. The carbon seal ring is retained by an anti-rotation pin extending through a slot in the ring. The carbon ring has a single fracture at the slot. The seal housing is provided with a plurality of calibrated holes for predetermined internal pressurization and cooling.

15 Claims, 3 Drawing Figures

U.S. Patent   June 22, 1976   3,964,753
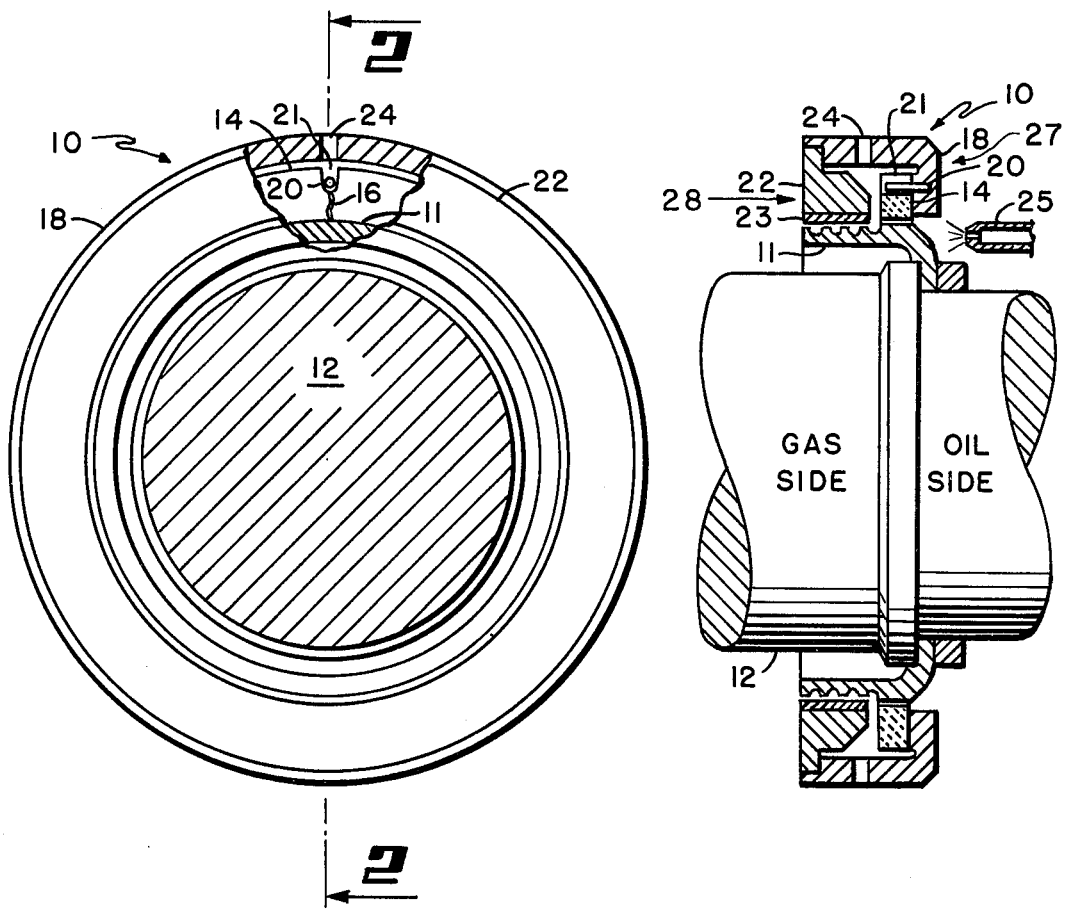
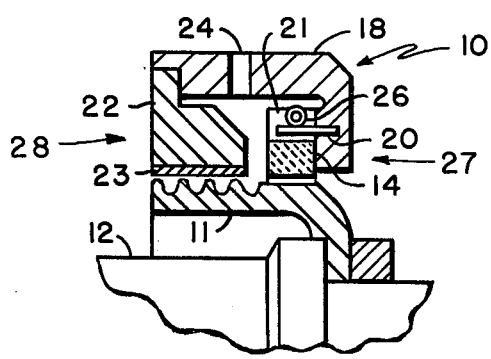

CONTROLLED APERTURE SEAL

BACKGROUND AND SUMMARY OF THE INVENTION

The disclosed seal is used in a high performance gas turbine engine as a shaft seal for the purpose of preventing gases at high temperature and pressure from entering the engine oil system. In a particular embodiment the seal operated successfully at shaft speed of 465 feet per second, gas pressure of 45 psia and gas temperature of 1200°F. Under these conditions prior art seals, capable of preventing oil or air leakage, had very short lives. The present invention is an improvement over the prior art in that it utilizes a carbon ring which under normal operating conditions is subject to essentially no wear. The carbon seal ring is fabricated so that its inner diameter is initially larger than the cool seal runner size, but slightly smaller than the hot runner size. Therefore, the carbon seal ring initially presents a gap through which a controlled air leakage occurs. However, when the shaft diameter grows due to temperature and centrifugal forces during initial operation the carbon seal ring is worn by runner friction until its final size is equal to the hot seal runner diameter. Thus, after initial operation the carbon seal ring is perfectly conformed to the seal runner and has essentially no gap, only an oil bearing film is provided between the carbon seal ring and the shaft.

In summary, the resulting aperture of the carbon seal ring is self-adjusting during initial engine operation as a result of seal runner thermal and centrifugal growth. During subsequent engine operation and after complete conforming of the carbon seal ring, both wear and heat generation at the carbon seal ring are negligible. The carbon ring is fractured at one location to permit ring expansion sufficient to accommodate initial thermal growth of the shaft. In addition, the carbon ring is pinned to the housing through a single radial slot for anti-rotation of the carbon ring and to accommodate shaft eccentricity or run out. The combination of the single anti-rotation pin, the single crack or fracture in the carbon ring, and the frictional torque results in a couple which unwinds the carbon ring; this minimizes wear.

THE DRAWINGS

FIG. 1 is an end view showing one embodiment of this invention;

FIG. 2 is a cross section taken through the line 2—2 in FIG. 1; and

FIG. 3 is an enlarged view similar to FIG. 2 but showing a modification thereof.

DESCRIPTION OF THE INVENTION

Referring to FIGS. 1 and 2, a seal 10 is shown mounted on the seal runner 11 of a rotating shaft 12. The purpose of the seal is to prevent the leakage of gases into the oil system from area 28 and prevent oil leakage from area 27.

In the anticipated environment of area 28 for which this seal was designed, the gas had an operating temperature of 1200°F., and an operating pressure of 45 psia. Moreover, the shaft 12 was rotated at a speed of 465 feet per second with respect to the seal 10. The maximum allowable air leakage into the bearing package was 2500 standard cubic inch/minute. It will be understood, of course, that the seal will operate at higher and lower speeds and at higher and lower pressures but that its advantage is mainly demonstrated under high performance operating conditions.

The sealing element is a carbon ring 14 which is initially provided with an oversized inner diameter, i.e., it is initially larger than the outer diameter of the seal runner 11. The carbon ring 14 is pinned to the seal housing 18 by means of a pin 20 extending through a radial slot 21, and it is provided with a radial fracture 16 at the pin location. The fracture has two different functions: first, to accommodate initial thermal growth, and second, the fracture by itself achieves a total radial and axial sealing after the ring is conformed to the runner. The carbon ring 14 is retained within the housing 18 by means of a retainer ring 22 which together with the seal runner 11 provides a conventional labyrinth seal 23.

The housing 18 is provided with a plurality of gas ports 24 calibrated for predetermined internal pressurization and cooling and to provide an axial, aerodynamic pressure load on carbon ring 14 against housing 18 to avoid radial leakage.

The particular inner dimensions of the controlled aperture carbon ring are determined by calculation and testing. The carbon ring 14 inner diameter is designed so that it is initially oversized or larger than the cool runner size, but smaller when the shaft is hot. As the shaft grows, the runner 11 contacts and expands the carbon ring. The final size of the carbon ring aperture at hot shaft conditions is determined by the wear initially resulting from shaft thermal and centrifugal growth, so that after initial shaft operation, the carbon ring is perfectly conformed and has essentially no gap between it and the shaft. The small gap which does exist is filled with an oil bearing film; oil is provided for cooling and lubrication by an oil jet 25. In other words, the resulting aperture of the carbon ring is self-adjusting during initial engine operation as a result of shaft thermal and centrifugal growth so that after the carbon ring conforms to the runner there is essentially no additional wear during normal operation because radial loading on the carbon ring from surrounding gas pressure does not have any clamping action on the runner, since the seated ends of the carbon ring, at the fracture, act as a solid ring.

The fracture at 16 is provided to accommodate any shaft growth, but does not permit any radial or axial leakage once the ring has worn to shaft size at full operating temperature. The single anti-rotation pin 2 in conjunction with the slot 21 permits the free pivoting of the sealing ring 14 out of the way of the shaft so that shaft orbiting or run out of shaft (eccentricity) is accommodated.

The carbon ring 14 is designed so that it is self-adjusting during engine operation so as to accommodate both thermal and centrifugal growth. The combination of a single anti-rotation pin 20 and the single fracture in the sealing ring allows for ring "unwind" under those critical conditions where oil film breakdown and partial shaft contact occurs. The unwinding of the carbon sealing ring minimizes wear if contact does occur, since a wedge-shaped gap results and permits a hydrodynamic flow of lubricant to restore the oil bearing film. When the shaft is at operating temperature there is essentially no air leakage into the bearing package.

The embodiment illustrated in FIG. 3 is identical to that shown in FIG. 2 except that a garter spring 26 is mounted on the carbon ring 14. In most instances the garter spring 26 is not needed since the seal ring has sufficient inherent resiliency.

It will be apparent to persons skilled in the art that the foregoing embodiments are subject to many modifications and adaptations. For example, while we show a separate seal runner 11 mounted on a shaft 12, it will be understood that the invention can work equally well where the seal runner is integral with the shaft. It is also understood depending on the specific engine configuration and seal environmental location that optimum seal performance may be achieved without internal pressurization.

We claim:

1. A seal for use on a high-speed rotating shaft, the combination comprising:
   a seal runner on said shaft;
   a seal housing;
   a seal ring within said housing, said seal ring having an inner diameter greater than the outer diameter of said runner when said shaft is cold and essentially equal to the diameter of said runner during normal operating conditions;
   a radial slot in said ring;
   means pivoting said seal ring to said housing through said slot for permitting radial and pivotal movement of said ring;
   a radial fracture in said ring; and
   means retaining said seal ring within said housing.

2. The invention as defined in claim 1 wherein said seal ring is carbon and is inherently circumferentially resilient.

3. The invention as defined in claim 1, and a circumferential garter spring on said seal ring.

4. The invention as defined in claim 1 wherein said housing is provided with a plurality of circumferentially spaced ports for admitting gas under pressure to said housing, said ports being sized for providing predetermined internal pressurization for optimum seal performance, cooling and to provide an axial, aerodynamic pressure load on said seal ring against the housing to avoid radial leakage.

5. The invention as defined in claim 4 and means for supplying a film of oil between said ring and said runner.

6. The invention as defined in claim 5 wherein said retaining means and said runner form a labyrinth seal.

7. The invention as defined in claim 1 wherein said fracture is at said slot.

8. A seal for use on a high-speed rotating shaft, the combination comprising:
   a seal runner on said shaft;
   a stationary seal housing;
   a ring mounted about said runner and pivoted to said housing, said ring having a single radial fracture therethrough, the inner diameter of said ring prior to initial use being smaller than the diameter of said runner under normally hot operating conditions, whereby said ring expands at said fracture until worn by friction to the size of said runner.

9. The invention as defined in claim 8 and means for internally pressurizing said ring against said housing for optimum seal performance.

10. The invention as defined in claim 9 wherein said pressurizing means comprises a plurality of ports in said housing for admitting pressurized gas to said housing, said gas providing a coolant for said seal.

11. The invention as defined in claim 8 and means for retaining said ring within said housing.

12. The invention as defined in claim 11 wherein said retaining means and said runner comprise a labyrinth seal.

13. The invention as defined in claim 8 wherein said ring has a radial slot and is pivoted to said housing through said slot and wherein said fracture is at said slot.

14. The invention as defined in claim 8 wherein said ring is carbon and is inherently circumferentially resilient.

15. The invention as defined in claim 8 and a garter spring surrounding said ring.

* * * * *